(12) United States Patent
Kerr et al.

(10) Patent No.: US 8,584,194 B1
(45) Date of Patent: Nov. 12, 2013

(54) NETWORK ACCESS CONTROL USING A QUARANTINED SERVER

(75) Inventors: Brian J. Kerr, Pleasant Grove, UT (US); Russell Anderson, Salt Lake City, UT (US); Corey Young, South Jordan, UT (US)

(73) Assignee: Crimson Corporation, Dover, DE (US)

( * ) Notice: Subject to any disclaimer, the term of this patent is extended or adjusted under 35 U.S.C. 154(b) by 1631 days.

(21) Appl. No.: 11/214,467

(22) Filed: Aug. 29, 2005

(51) Int. Cl.
*G06F 17/00* (2006.01)

(52) U.S. Cl.
USPC ............ 726/1; 726/2; 726/3; 726/4; 709/227; 709/229

(58) Field of Classification Search
USPC .......... 713/1, 2, 188, 194; 380/200, 201, 255, 380/277; 726/5, 1–4; 709/227, 229
See application file for complete search history.

(56) References Cited

U.S. PATENT DOCUMENTS

| | | | |
|---|---|---|---|
| 6,256,739 B1 * | 7/2001 | Skopp et al. ...................... | 726/2 |
| 6,609,154 B1 | 8/2003 | Fuh et al. | |
| 6,768,743 B1 * | 7/2004 | Borella et al. ................. | 370/401 |
| 7,249,187 B2 * | 7/2007 | Sobel et al. ................... | 709/229 |
| 7,305,489 B2 * | 12/2007 | Puthiyandyil et al. ........ | 709/245 |
| 2005/0185595 A1 * | 8/2005 | Lee ................................ | 370/252 |
| 2006/0242401 A1 * | 10/2006 | Elliger et al. ..................... | 713/2 |
| 2008/0120350 A1 * | 5/2008 | Grabowski et al. ........... | 707/202 |

OTHER PUBLICATIONS

Cisco Secure Access Control Server, http://www.cisco.com/en/US/products/sw/secursw/ps2086/products_data_sheet09186a00800887d5.html, Jul. 1, 2005, pp. 1-4.

* cited by examiner

*Primary Examiner* — Saleh Najjar
*Assistant Examiner* — Joseph Pan
(74) *Attorney, Agent, or Firm* — Austin Rapp & Hardman (57) ABSTRACT

Network address requests from candidate nodes are directed to a quarantined server rather than a network address server. The candidate node is admitted to a virtual network, enabling the candidate node to access only limited resources of the network and minimizing security risks to the network. The quarantined server determines whether the candidate node complies with a set of security criteria. If the candidate node conforms to the set of criteria, when a second request for a network address is sent by the candidate node, the second request is received by the quarantined server and relayed to the network address server. Thereafter, the network address server will issue a network address to the candidate node, enabling the candidate node to access at least a portion of the full resources of the network. If the candidate node does not comply with the security criteria and cannot be remediated, the network address server will not issue a network address to the candidate node.

19 Claims, 6 Drawing Sheets

NETWORK ACCESS CONTROL USING A QUARANTINED SERVER

TECHNICAL FIELD

The present invention relates generally to computers and computer-related technology. More specifically, the present invention relates to minimizing security risks to a network while a node is being added to the network.

BACKGROUND

Computer technologies continue to advance at a rapid pace. Indeed, computers are used in almost all aspects of business, industry and academic endeavors. Improvements in computer technologies have been a force for bringing about great increases in business and industrial productivity. More and more homes are using computers as well.

There are many different kinds of computers in use today. The term "computer system" will be used herein to refer generally to any device or combination of devices that is capable of processing information to produce a desired result. Some examples of computer systems include personal computers, hand-held computers, personal digital assistants (PDAs), servers, mainframes, supercomputers, minicomputers, workstations, microcomputers, microcontrollers, and the like.

Networking technology enables a group of computer systems to share resources (e.g., files, computer programs, printers, and scanners). Computer networks are becoming increasingly important to productivity and are found in almost all walks of life. Unfortunately, computer viruses and attacks by "hackers" are becoming more and more prevalent and threaten the stability and security of many networks.

Networks, are particularly vulnerable to attack when a new node is being added to a network. The new node may be infected by viruses or spyware, or may not be properly secured to prevent an attack by a hacker, potentially undermining the security of the entire network.

Unfortunately, known systems and methods for securely adding a node to a network suffer from various drawbacks. In particular, these solutions are expensive both in monetary terms and in terms of computing downtime. For example, some solutions require the installation of proprietary routers and switches, forcing network administrators to reconfigure the entire network and forcing the network owners to expend significant funds in reconstituting the network.

Accordingly, benefits may be realized by improved systems and methods for securely adding a node to a network in a cost effective manner. Some exemplary systems and methods for securely adding a node to a network are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A method for minimizing security risks presented by adding a new node to a network is disclosed. A first request to obtain a network address for a network from a candidate node is obtained at a validation module of a quarantined server. The quarantined server may comprise a plurality of servers or a single server. A quarantined network address for a virtual network is transmitted to the candidate node to enable the candidate node to communicate with only resources within the virtual network. From a remediation module of the quarantined server, it is determined whether the candidate node satisfies a set of security criteria. An authorization message is received at the validation module if the candidate node satisfies the set of security criteria. A relayed request for a network address is transmitted from the validation module to a network address server. A candidate node that does not satisfy the set of security criteria is prevented from transmitting a request for a network address, either directly or by a relayed request, to the network address server even if a conventional non-specialized router or switch is present in the network.

In one embodiment, a second request for a network address from the candidate node is captured at the validation module. The relayed request for a network address is transmitted to the network address server in response to capturing the second request. The method may further comprise transmitting a network address from the network address server to the candidate node. In one embodiment, the method may further comprise attempting to remediate the candidate node if the candidate node does not conform to the set of security criteria.

The network may be configured such that all network address requests are directed to the validation module of the quarantined server rather than the network address server. In one embodiment, the validation module captures only network address requests and all other network traffic is not required to pass through the validation module of the quarantined server.

In one embodiment, the network is an Internet protocol (IP) network. In such an embodiment, the network address server may be a Dynamic Host Configuration Protocol (DHCP) server, and the second request for a network address may be an IP renewal request.

A computer system configured to implement the methods described above is also disclosed. The system includes a processor and memory in electronic communication with the processor. Instructions are stored in the memory to implement the methods described above. A computer-readable medium comprising executable instructions for implementing the methods described above is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The term "computer-readable medium" as used herein refers to any type of format or device (both tangible and intangible) from which computer code of any kind may be read. Accordingly, this term encompasses, but is not limited to, portable media (e.g., compact discs, a "thumb" drive, a compact flash card, and a portable hard drive), non-portable media (e.g., a hard disk storage device within a computer system), and transmission media (e.g., computer code downloaded via a network, and streaming code—which may include multimedia content).

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Figure 1:
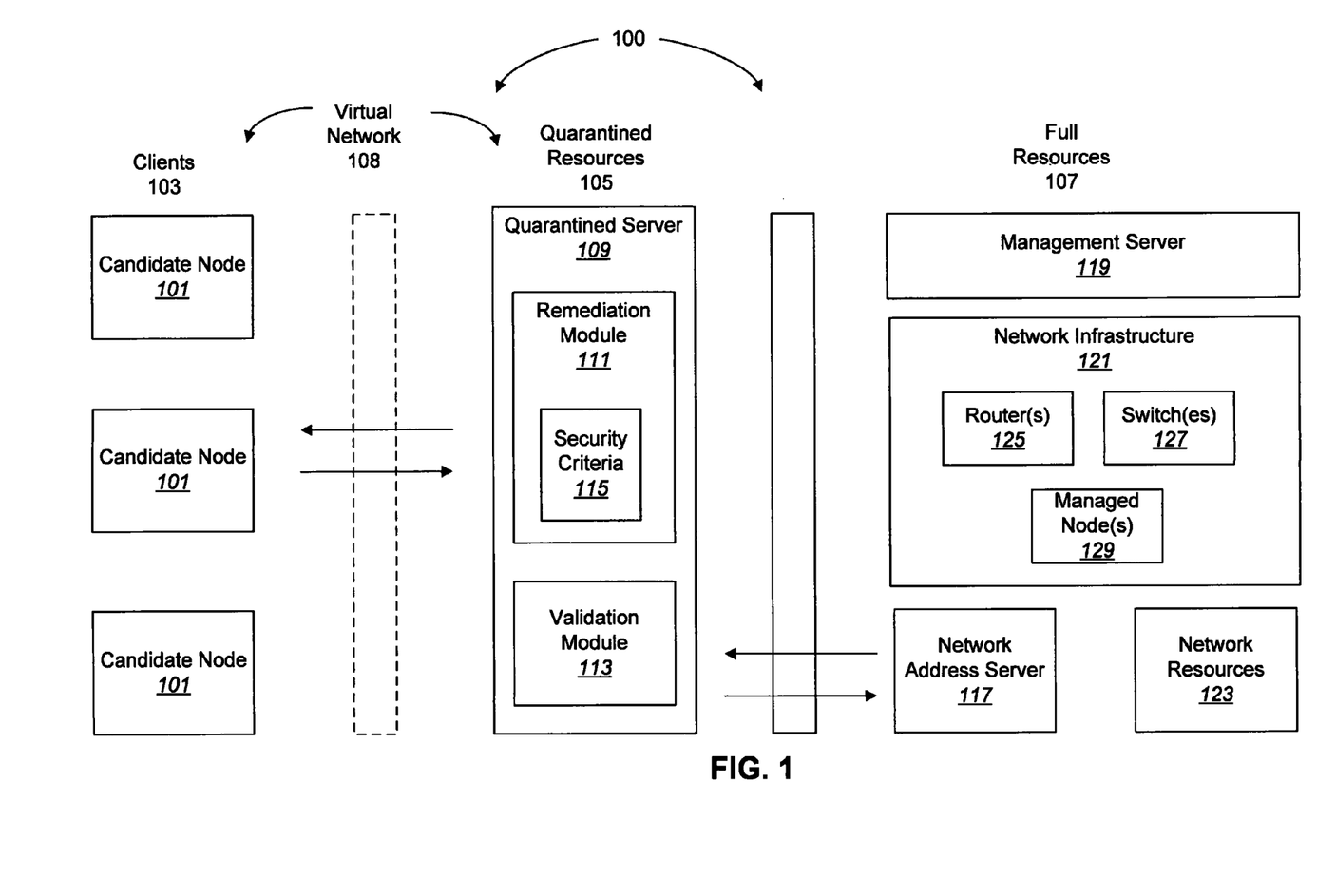
FIG. 1 is a block diagram illustrating one embodiment of a system of minimizing security risks when a candidate node is being added to a network.

FIG. 1 is a block diagram illustrating one embodiment of a network 100 that minimizes security risks when a candidate node 101 is being added to the network 100. The network 100 depicted in FIG. 1 may be embodied in a wide variety of configurations and may include a combination of multiple networks. The network 100 may include, for example, a local area network (LAN), storage area networks (SANs), metropolitan area networks (MANs), wide area networks (WANs), and combinations thereof (e.g., the Internet). A variety of different network configurations and protocols may be used, including, for example, Ethernet, TCP/IP, UDP/IP, IEEE 802.11, IEEE 802.16, Bluetooth, asynchronous transfer mode (ATM), fiber distributed data interface (FDDI), token ring, and so forth, including combinations thereof. Of course, some embodiments may also be practiced with conventional point-to-point connections, such as enterprise systems connection (ESCON), small computer system interface (SCSI), fibre channel, etc., that may not typically be viewed as a "network."

For purposes of illustrating the systems and methods disclosed herein, the network 100 is divided into three groups: clients 103, quarantined resources 105, and full resources 107. A virtual network 108 is also included within the network 100. The depicted virtual network 108 encompasses the quarantined resources 105 and clients 103 that have been added to the virtual network 108.

The clients 103 include candidate nodes 101, i.e., computing devices that are being considered for addition to the network 100. The candidate nodes 101 may include many different types of computing devices, such as conventional computer workstations and any device that may be connected to a network 100. For example, many hand-held computing devices, such as the iPAQ® 3870, may be equipped with 802.11b wireless networking capabilities, and thus can connect to the network 100 using a wireless connection, if available. Accordingly, a wide variety of different computer systems and computing devices may be considered candidate nodes 101.

The quarantined resources 105 include any resources of the network 100 within the virtual network 108. These resources 105 may be accessed by candidate nodes 101. The quarantined resources 105 include, for example, a quarantined server 109. The quarantined server 109 includes various modules, such as a remediation module 111 and a validation module 113. The remediation module 111 performs various functions, including determining whether a candidate node 101 satisfies a set of security criteria 115 and/or attempting to update, or remediate, a non-conforming candidate node 101 to conform to the set of security criteria 115.

Within the network 100, network address requests are directed to the validation module 113, rather than the network address server 117. Various techniques may be used to modify the topology of the network 100 to direct network address requests to the validation module 113. For example, in one embodiment, network address requests are directed to the validation module 113 using an IP address helper on a switch or router.

When the validation module 113 receives requests for a network address (such as an Internet protocol (IP) address), the validation module 113 determines whether such a request will be forwarded, or relayed, to a network address server 117. The validation module 113 may also communicate with other modules of the quarantined server 109 or other network resources to determine whether a request for a network address should be relayed to the network address server 117.

In one embodiment, the validation module 113 captures only network address requests. All other network traffic is not required to pass through the validation module 113 of the quarantined server 109, thus minimizing the impact or burden that the security systems and methods disclosed herein will have on network traffic.

The validation module 113 may also issue a quarantined network address to a requesting candidate node 101 such that the candidate node 101 may be admitted to the virtual network 108. Admission to the virtual network 108 enables the quarantined server 109 to determine whether the candidate node 101 satisfies the set of security criteria 115 before allowing the candidate node 101 to access the full resources 107 of the network 100.

The modules 111, 113 may be embodied as hardware, software, or a combination of both. In addition, the modules 111, 113 may both include common resources, such as jointly used hardware and/or software code.

The quarantined server 109 may be embodied as one or more physical servers configured to provide access to the limited resources of the virtual network 108. If the quarantined server 109 includes multiple discrete, physical servers, portions of the modules 111, 113 may reside on different physical servers.

The quarantined resources 105 could also include, by way of example, printers, scanners, shared files, shared programs, or Internet access. The quarantined resources 105, however, are limited to minimize risks to the security and stability of the overall network 100.

As noted above, the virtual network 108 encompasses the quarantined resources 105 and any candidate node 101 that has been added to the virtual network 108. The virtual network 108 may be embodied in various ways, such as a virtual local area network (VLAN). A VLAN is a logical subgroup within a local area network that is created by software rather than rewiring cables connecting the network. The VLAN combines user stations and network devices into a single unit regardless of the physical segment of the local area network (LAN) to which the stations are attached. The virtual network 108 may also include, for example, a virtual WAN, SAN, or MAN. Regardless of the type of network, candidate nodes 101 within the virtual network 108 may not access the full resources 107 of the network 100, but may only communicate with resources within the virtual network 108.

The full resources 107 of the network 100 may include any resource that may be connected or used within the network 100. For example, the full resources 107 may include a management server 119, network infrastructure 121, a network address server 117, and other network resources 123. The management server 119 may manage, in one embodiment, nodes 129 that have already been added to the network 100 (i.e., managed nodes 129) and could perform various management tasks. For example, the management server 119 could inventory assets (i.e., hardware and software) of the managed nodes 129. The management server 119 can, in one embodiment, facilitate and/or automate remote installation of software (including software packages and updates) on managed nodes 129 and can even facilitate or automate migration of a managed node 129 to a new operating system. The management server 119 may determine the hardware and software configuration of a managed node 129. In addition, the management server 119 may determine what software licenses are available for a particular node 129 or whether currently installed software is properly licensed. The management server 119 may also enable remote diagnosis and resolution of computing issues. One or more of the foregoing management tasks may be performed by the management server 119 using, for example, LANDesk® Security Suite, LANDesk® Patch Manager, LANDesk® Management Suite, LANDesk® Instant Support Suite Pro, LANDesk® Inventory Manager produced by LANDesk Software, Inc., of South Jordan, Utah.

The network infrastructure 121 may include routers 125, switches 127, and nodes 129. The network infrastructure 121 may be embodied in a wide variety of different configurations. An example of the network infrastructure 121 is further illustrated in FIG. 6.

The systems and methods disclosed herein, in contrast to previously used network access control systems, do not require specialized routers and switches that are configured to limit access to the network address server 117. Accordingly, the systems and methods disclosed herein may be implemented in connection with a network 100 having conventional, non-specialized routers 125 and switches 127. The cost of implementing the systems and methods disclosed herein is significantly smaller than prior art network access control systems, which require specialized routers and servers designed to limit access to the network address server 117.

The network address server 117 shown in FIG. 1 receives requests for network addresses from the validation module 113 of the quarantined server 109 and dispenses a network address to qualified, requesting candidate nodes 101. The network address server 117 may be embodied in a wide variety of different configurations. For example, when the network 100 is an IP network, the network address server 117 may be a Dynamic Host Configuration Protocol (DHCP) server 117 that issues an IP address to qualified nodes 101. By issuing a network address to a requesting candidate node 101, the candidate node 101 may be admitted to the network 100 and access at least a portion of the full resources 107 of the network 100.

The network 100 may optionally include other network resources 123, such as printers, scanners, shared files, shared programs, or Internet access that are not available to candidate nodes 101.

Figure 2:
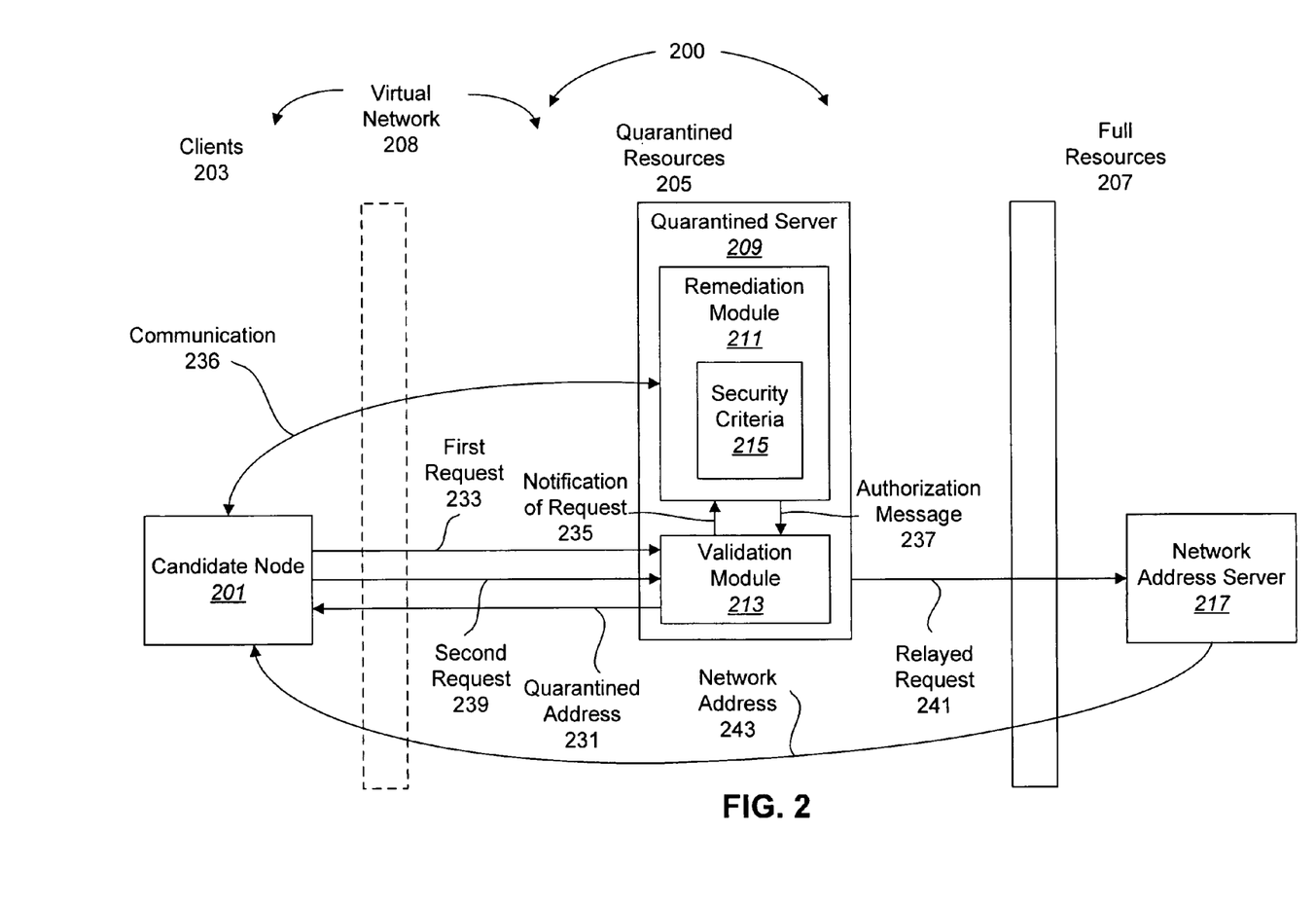
FIG. 2 is a block diagram illustrating one embodiment of a system of minimizing security risks to a network in which a candidate node satisfies a set of security criteria.

FIG. 2 is a block diagram illustrating one embodiment of a system of minimizing security risks to a network 200 in which the candidate node 201 satisfies the set of security criteria 215. As noted above, the network 200 may be divided into clients 203, quarantined resources 205, and full resources 207. A virtual network 208 encompasses the quarantined resources 205 and clients 203, or candidate nodes 201, that have received a quarantined network address 231. The quarantined resources 205 include a quarantined server 209 having a remediation module 211 and a validation module 213. The remediation module 211 may include a set of security criteria 215. The full resources 207 include a network address server 217 and other optional features and components such as those depicted in FIG. 1 within the full resources 107 section.

A first request 233 for a network address transmitted by the candidate node 201 is captured at the quarantined server 209 by a validation module 213. As noted above, network address requests 233 within the network 200 are directed to the validation module 213, not the network address server 217. The validation module 213 transmits a quarantined address 231 for a virtual network 208 to the candidate node 201, enabling the candidate node 201 to access the quarantined resources 205 of the network 200. Admission to the virtual network 208 also enables communication with other quarantined resources 205, such as a remediation module 211 or candidate nodes 201 that have received a quarantined network address 231.

A notification of request 235 is transmitted to the remediation module 211 of the quarantined server 209 to indicate that a request 233 for a network address has been received. The notification of request 235 may also include the quarantined address 231 for the virtual network 208 and any credentials necessary to access the candidate node 201, if necessary.

The remediation module 211 engages in communication 236 with the candidate node 201 to determine whether the candidate node 201 satisfies the set of security criteria 215. The communication may include, for example, a script that scans the candidate node 201 to determine whether the set of security criteria 215 is satisfied, and then transmits a message to the remediation module 211 or validation module 213 of the quarantined server 209 indicating the security status of the candidate node 201.

The set of security criteria 215 may be embodied in a wide variety of configurations and may have one or numerous requirements to ensure that the candidate node 201 will not pose a security risk to the network 200, once admitted to the network 200. In particular, the set of security criteria 215 may require the candidate node 201 to run or incorporate certain types of software or hardware that minimize any risks posed to the network 200. For example, in one embodiment, the set of security criteria 215 may require that the candidate node 201 use an updated version of anti-virus software, anti-spyware software, and the most secure and updated version of its operating system.

In the illustration shown in FIG. 2, the candidate node 201 satisfies the set of security criteria 215. Accordingly, an authorization message 237 is received at the validation module 213, indicating that the candidate node 201 has satisfied the set of security criteria 215. In the illustrated embodiment, the authorization message 237 is transmitted from the remediation module 211 to the validation module 213. In an alternative embodiment, the authorization message 237 is transmitted from the candidate node 201, or another location, to the validation module 213.

Thereafter, a second request 239 for a network address is transmitted from the candidate node 201 to the validation module 213. This request 239 may be triggered by a number of different events, such as user intervention or a time out. In one embodiment, the second request 239 is an IP renewal request from the candidate node 201.

In one embodiment, the relayed request 241 is transmitted from the validation module 213 in response to receipt of the authorization message 237. In such a case, a second request 239 from the candidate node 201 is not required to trigger transmission of the relayed request 241 to the network address server 217.

In response to receipt of the second request 239, the validation module 213 transmits a relayed request 241 for a network address to the network address server 217. In response to this request 241, the network address server 217 transmits a network address 243 to the candidate node 201, enabling the candidate node 201 to join the network 200 and access at least a portion of the full resources 207 of the network 200.

Figure 3:
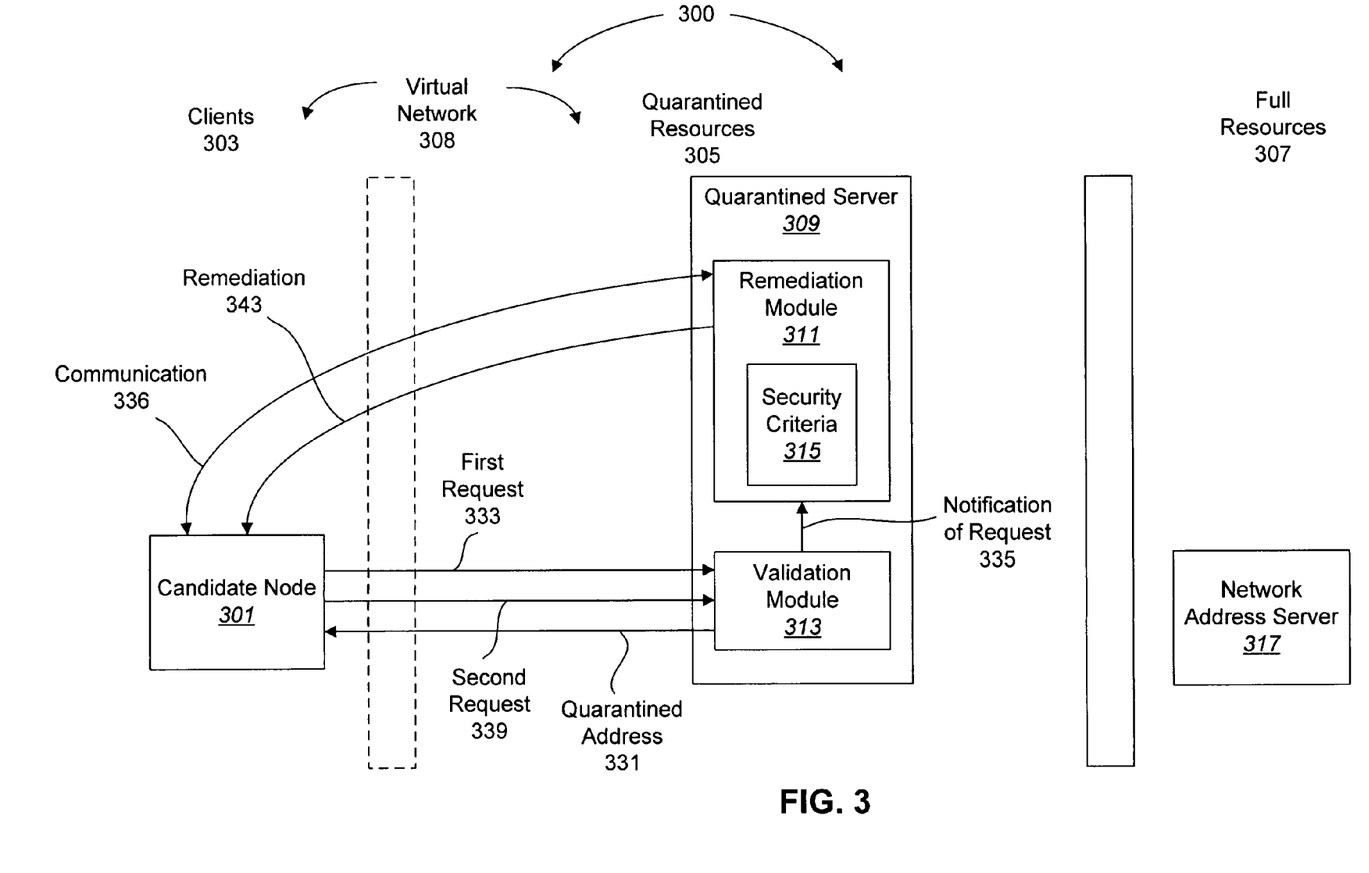
FIG. 3 is a block diagram illustrating one embodiment of a system of minimizing security risks to a network in which the candidate node fails to satisfy a set of security criteria.

FIG. 3 is a block diagram illustrating one embodiment of a system of minimizing security risks to a network 300 in which the candidate node 301 fails to satisfy the set of security criteria 315. As noted above, the network 300 may be divided into clients 303, quarantined resources 305, and full resources 307. A virtual network 308 encompasses the quarantined resources 305 and clients 303, or candidate nodes 301, that have received a quarantined network address 331. The quarantined resources 305 include a quarantined server 309 having a remediation module 311 and a validation module 313. The remediation module 311 may include a set of security criteria 315. Again, the full resources 307 include a network address server 317 and other optional features and components such as those depicted in FIG. 1 within the full resources 107 section.

As illustrated in FIG. 3, a first request 333 for a network address is transmitted from the candidate node 301 to a validation module 313 of the quarantined server 309. A quarantined address 331 is transmitted from the validation module 313 to the candidate node 301, enabling the candidate node 301 to be admitted to a virtual network 308 and access the quarantined resources 305 of the network 300.

A notification of request 335 is transmitted from the validation module 313 to the remediation module 311. Thereafter, the remediation module 311 of the quarantined server 309 engages in communication 336 with the candidate node 301 to determine whether the candidate node 301 satisfies the set of security criteria 315. In the example illustrated in FIG. 3, the candidate node 301 fails to satisfy the set of criteria 315 and is thus a non-compliant candidate node 301.

The remediation module 311 may then optionally attempt to remediate 343, or update, aspects of the candidate node 301 to conform to the set of security criteria 315. As illustrated in FIG. 3, the remediation efforts of the remediation module 311 also fail. Accordingly, no authorization message 237 (shown in FIG. 2) is received by the validation module 313.

As a result, when a second request 339 for a network address is transmitted from the candidate node 301 to the validation module 313, the validation module is not authorized to relay a network address request to the network address server 317. The candidate node 301 will thus not be admitted to the network 300, minimizing security risks to the network 300.

Accordingly, a candidate node 301 that does not satisfy the set of security criteria 315 is prevented from transmitting a request for a network address, either directly or by a relayed request, to the network address server, even if a conventional non-specialized router or switch is present in the network. The systems and methods disclosed herein thus provide enhanced security to a network 300 without the additional expense and burden of installing of specialized routers and switches.

Of course, if the remediation efforts of the remediation module 311 were successful, an authorization message 237 (shown in FIG. 2) would be received by the validation module 313 and, ultimately, the network address server 317 would issue a network address 243 to the candidate node 301, as illustrated in FIG. 2.

Figure 4:
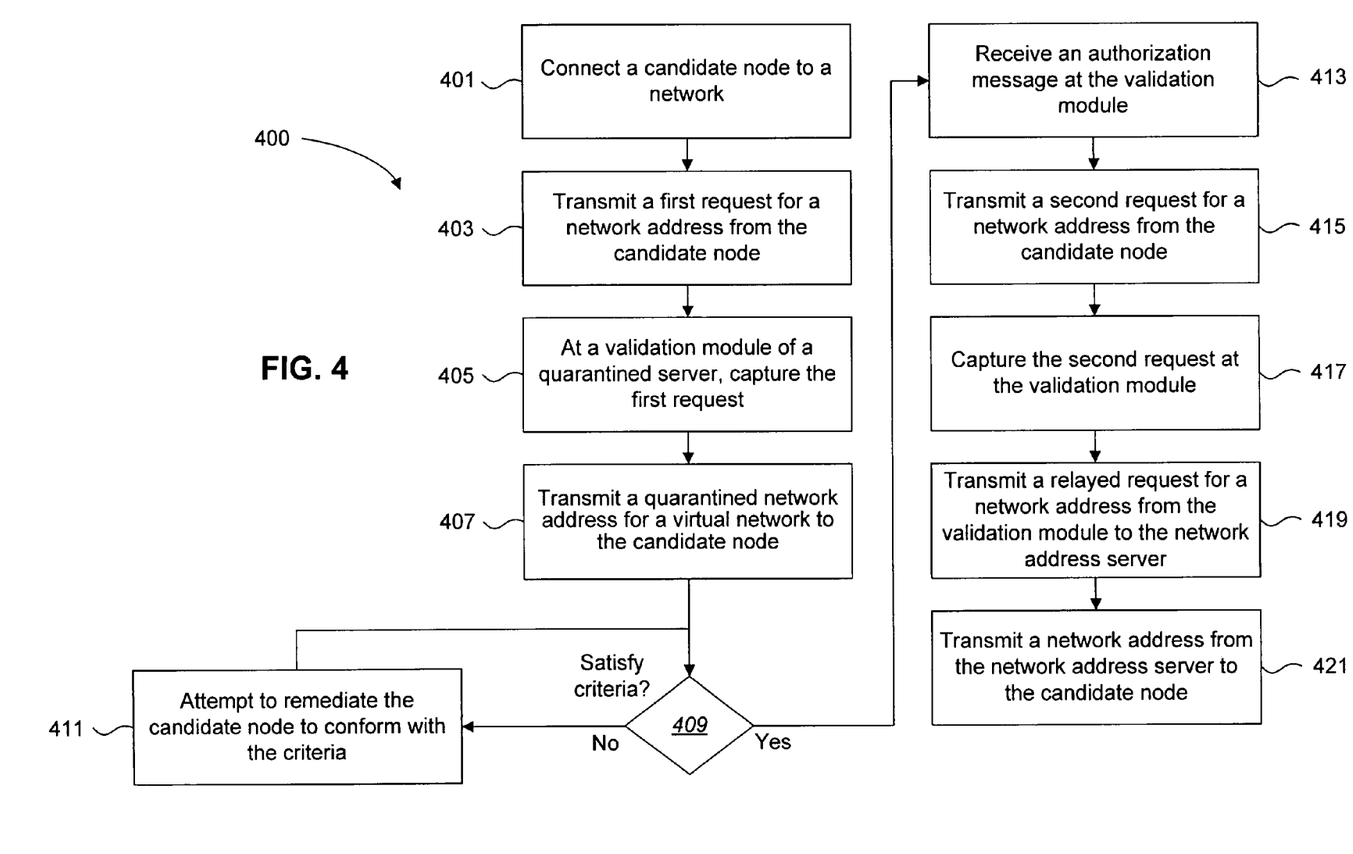
FIG. 4 is a flow diagram of a system for minimizing security risks to a network while adding a node.

FIG. 4 is a flow diagram of a method 400 for minimizing security risks to a network 300 while adding a node 301 to the network 300. A candidate node 301 is connected 401 to the network. The candidate node transmits 403 a first request 333 for a network address. The first request is captured 405 by a validation module 313 of a quarantined server 309. A quarantined network address 331 for a virtual network 308 is transmitted 407 to the candidate node. The quarantined network address may be transmitted 407 from the validation module or component among the quarantined resources 305.

It is next determined 409, by a remediation module 311, whether the candidate node satisfies a set of security criteria 315. If the candidate node does not satisfy the set of security criteria, the remediation module may optionally attempt 411 to update the candidate node to conform to the set of security criteria.

If the candidate node conforms to the set of security criteria (either before or after remediation), an authorization message 237 is received 413 at the validation module 313. The authorization message may be transmitted to the validation module, for example, by the remediation module, by the candidate node, or by another component within the quarantined resources. Thereafter, when the candidate node transmits 415 a second request 339 for a network address, the second request is captured 417 by the validation module. The second request may be, for example, an IP renewal request if the network is an IP network.

Because the authorization message was previously received by the validation module, the validation module transmits 419 a relayed request 341 for a network address from the validation server to the network address server in response to receipt of the second request. Alternatively, the relayed request may be transmitted to the network address server in response to receipt of the authorization message, i.e., the validation module does not await a second request to transmit a relayed request to the network address server. In response to receipt of the relayed request, the network address server transmits 421 a network address to the candidate node, enabling the candidate node to join the network and access at least a portion of the full resources 307 of the network.

Figure 5:
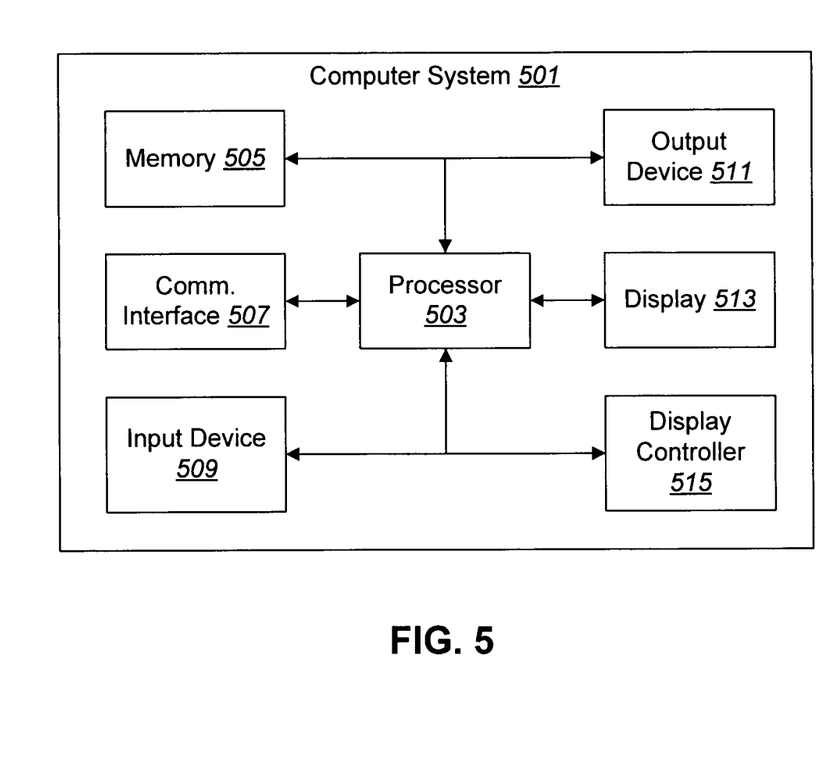
FIG. 5 is a block diagram illustrating the major hardware components typically utilized in a computer system.

FIG. 5 is a block diagram illustrating the major hardware components typically utilized in a computer system 501. The illustrated components may be located within the same physical structure or in separate housings or structures.

The computer system 501 includes a processor 503 and memory 505. The processor 503 controls the operation of the computer system 501 and may be embodied as a microprocessor, a microcontroller, a digital signal processor (DSP) or other device known in the art. The processor 503 typically performs logical and arithmetic operations based on program instructions stored within the memory 505.

As used herein, the term memory 505 is broadly defined as any electronic component capable of storing electronic information, and may be embodied as read only memory (ROM), random access memory (RAM), magnetic disk storage media, optical storage media, flash memory devices in RAM, on-board memory included with the processor 503, EPROM memory, EEPROM memory, registers, etc. The memory 505 typically stores program instructions and other types of data. The program instructions may be executed by the processor 503 to implement some or all of the methods disclosed herein.

The computer system 501 typically also includes one or more communication interfaces 507 for communicating with other electronic devices. The communication interfaces 507 may be based on wired communication technology, wireless communication technology, or both. Examples of different types of communication interfaces 507 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 501 typically also includes one or more input devices 509 and one or more output devices 511. Examples of different kinds of input devices 509 include a keyboard, mouse, microphone, remote control device, button, joystick, trackball, touchpad, lightpen, etc. Examples of different kinds of output devices 511 include a speaker, printer, etc. One specific type of output device which is typically included in a computer system is a display device 513. Display devices 513 used with embodiments disclosed herein may utilize any suitable image projection technology, such as a cathode ray tube (CRT), liquid crystal display (LCD), light-emitting diode (LED), gas plasma, electroluminescence, or the like. A display controller 515 may also be provided, for converting data stored in the memory 505 into text, graphics, and/or moving images (as appropriate) shown on the display device 513.

Of course, FIG. 5 illustrates only one possible configuration of a computer system 501. Various other architectures and components may be utilized.

Figure 6:
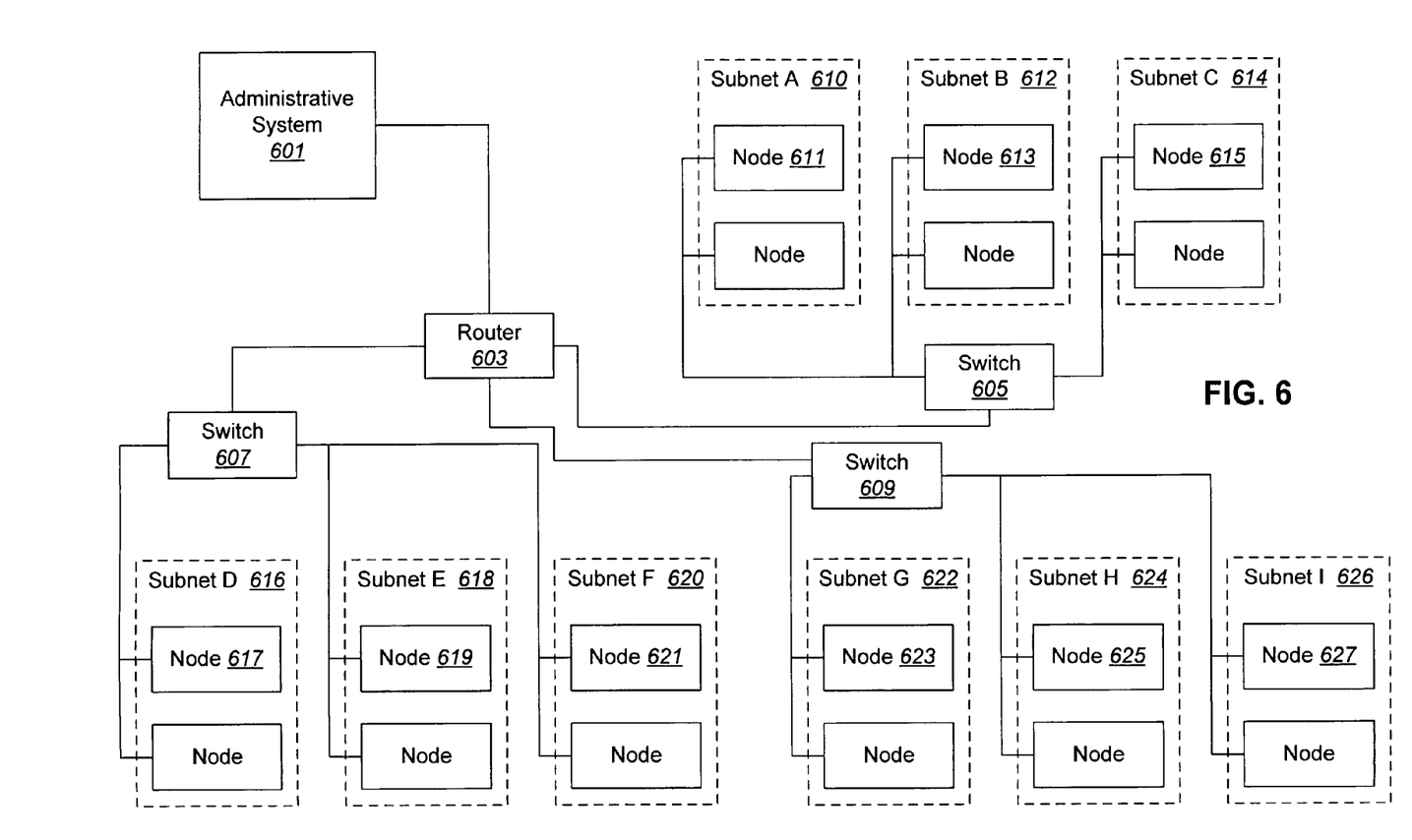
FIG. 6 is an exemplary block diagram illustrating a computer network in which the present systems and methods may be implemented.

FIG. 6 is an exemplary block diagram illustrating a computer network on which the present systems and methods may be implemented. In FIG. 6, an administrative system 601 connects to a router 603. The administrative system 601, or administrative node 601, may be any computer or computing device that has been configured to, or is being used for, receiving notifications from one or more monitors.

The router 603 may be connected to three switches: a first switch 605, a second switch 607 and a third switch 609. Each switch 605, 607, 609 connects to three subnets. The first switch 605 connects to three subnets 610, 612, and 614. The second switch 607 connects to three subnets 616, 618, and 620. The third switch 609 connects to three subnets 622, 624, and 626. The network groups 107, 207, 307, and 507 described above may be embodied in a wide variety of configurations and may include a local area network, a subnet 610, 612, and 614, or a group of subnets 610, 612, and 614. The network nodes or elements 611, 613, 615, 617, 619, 621, 623, 625 and 627 represent computer systems or devices on the computer network. One or more of the nodes may use embodiments of the systems and methods described herein. The network may include both wired and wireless connections to nodes or elements 611, 613, 615, 617, 619, 621, 623, 625 and 627 within the network.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various, illustrative logical blocks, components, modules, circuits, and algorithm steps described in connection with, the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for minimizing security risks presented by adding a new node to a network, comprising:
    capturing a first request to obtain a network address for a network from a candidate node at a validation module of a quarantined server;
    transmitting a quarantined network address for a virtual network to the candidate node to enable the candidate node to communicate with only resources within the virtual network, wherein transmitting the quarantined network address to the candidate node occurs after the first request to obtain the network address has been captured;
    admitting the candidate node to the virtual network, wherein the candidate node is admitted to the virtual network before any determination is made whether the candidate node satisfies a set of security criteria from a remediation module of the quarantined server;
    determining whether the candidate node satisfies the set of security criteria from the remediation module of the quarantined server, wherein determining whether the candidate node satisfies the set of security criteria occurs after the quarantined network address has been transmitted to the candidate node and is based upon the first request, wherein determining comprises sending a script from the quarantined server to the quarantined network address after the quarantined network address has been sent to the candidate node, wherein the script scans the candidate node to determine whether the candidate node uses an updated version of anti-virus software and an updated version of an operating system;
    receiving an authorization message at the validation module if the candidate node satisfies the set of security criteria;
    transmitting a relayed request for a network address from the validation module to a network address server,
        wherein a candidate node that does not satisfy the set of security criteria is prevented from transmitting a request for a network address, either directly or by a relayed request, to the network address server even if a conventional non-specialized router or switch is present in the network, wherein the validation module captures only network address requests and all other network traffic, either to or from the candidate node, is not required to pass through the validation module of the quarantined server; and
    transmitting a network address from the network address server to the candidate node when the candidate node does satisfy the set of security criteria, wherein the transmitted network address is transmitted directly to the candidate node and does not pass through the validation module of the quarantined server.

2. The method of claim 1, further comprising capturing a second request for a network address from the candidate node at the validation module, wherein the relayed request for a network address is transmitted to the network address server in response to capturing the second request.

3. The method of claim 2, wherein the network is an Internet protocol (IP) network.

4. The method of claim 3, wherein the network address server is a Dynamic Host Configuration Protocol (DHCP) server.

5. The method of claim 3, wherein the second request for a network address is an IP renewal request.

6. The method of claim 1, wherein the network is configured such that all network address requests are directed to the validation module of the quarantined server rather than the network address server.

7. The method of claim 1, wherein the quarantined server comprises a plurality of servers.

8. The method of claim 1, further comprising attempting to remediate the candidate node if the candidate node does not conform to the set of security criteria.

9. The method of claim 1, wherein determining whether the candidate node satisfies the set of security criteria is implemented on the quarantined server.

10. A computer system that is configured for minimizing security risks to a network while adding a node to the network, the computer system comprising:
    a processor;
    memory in electronic communication with the processor;
    instructions stored in the memory, the instructions being executable to:
        capture a first request to obtain a network address for a network from a candidate node at a validation module of a quarantined server;
        transmit a quarantined network address for a virtual network to the candidate node to enable the candidate node to communicate with only resources within the virtual network, wherein the quarantined network address is transmitted to the candidate node after the first request to obtain the network address has been captured;
        admit the candidate node to the virtual network, wherein the candidate node is admitted to the virtual network before any determination is made whether the candidate node satisfies a set of security criteria from a remediation module of the quarantined server;
        determine whether the candidate node satisfies the set of security criteria from the remediation module, wherein a determination whether the candidate node satisfies the set of security criteria occurs after the quarantined network address has been transmitted to the candidate node and is based upon the first request, wherein determining comprises sending a script from the quarantined server to the quarantined network address after the quarantined network address has been sent to the candidate node, wherein the script scans the candidate node to determine whether the candidate node uses an updated version of anti-virus software and an updated version of an operating system;
        receive an authorization message at the validation module if the candidate node satisfies the set of security criteria;
        transmit a relayed request for a network address from the validation module to a network address server,
            wherein a candidate node that does not satisfy the set of security criteria is prevented from transmitting a request for a network address, either directly or by a relayed request, to the network address server even if a conventional non-specialized router or switch is present in the network, wherein the validation module captures only network address requests and all other network traffic, either to or from the candidate node, is not required to pass through the validation module of the quarantined server; and transmit a network address from the network address server to the candidate node when the candidate node does satisfy the set of security criteria, wherein the transmitted network address is transmitted directly to the candidate node and does not pass through the validation module of the quarantined server.

11. The system of claim 10, wherein the instructions are further executable to capture a second request for a network address from the candidate node at the validation module, wherein the relayed request for a network address is transmitted to the network address server in response to capturing the second request.

12. The system of claim 10, wherein the network is configured such that all network address requests are directed to the validation module of the quarantined server rather than the network address server.

13. The system of claim 10, wherein the instructions are further executable to attempt to remediate the candidate node if it does not conform to the set of security criteria.

14. The system of claim 10, wherein determining whether the candidate node satisfies the set of security criteria is implemented on the quarantined server.

15. A non-transitory computer-readable medium comprising executable instructions for minimizing security risks to a network while adding a node to the network, the instructions being executable to:

capture a first request to obtain a network address for a network from a candidate node at a validation module of a quarantined server;

transmit a quarantined network address for a virtual network to the candidate node to enable the candidate node to communicate with only resources within the virtual network, wherein the quarantined network address is transmitted to the candidate node after the first request to obtain the network address has been captured;

admit the candidate node to the virtual network, wherein the candidate node is admitted to the virtual network before any determination is made whether the candidate node satisfies a set of security criteria from a remediation module of the quarantined server;

determine whether the candidate node satisfies the set of security criteria from the remediation module of the quarantined server, wherein a determination whether the candidate node satisfies the set of security criteria occurs after the quarantined network address has been transmitted to the candidate node and is based upon the first request, wherein determining comprises sending a script from the quarantined server to the quarantined network address after the quarantined network address has been sent to the candidate node, wherein the script scans the candidate node to determine whether the candidate node uses an updated version of anti-virus software and an updated version of an operating system;

receive an authorization message at the validation module if the candidate node satisfies the set of security criteria;

transmit a relayed request for a network address from the validation module to a network address server, wherein a candidate node that does not satisfy the set of security criteria is prevented from transmitting a request for a network address, either directly or by a relayed request, to the network address server even if a conventional non-specialized router or switch is present in the network, wherein the validation module captures only network address requests and all other network traffic, either to or from the candidate node, is not required to pass through the validation module of the quarantined server; and transmit a network address from the network address server to the candidate node when the candidate node does satisfy the set of security criteria, wherein the transmitted network address is transmitted directly to the candidate node and does not pass through the validation module of the quarantined server.

16. The non-transitory computer-readable medium of claim 15, wherein the instructions are further executable to capture a second request for a network address from the candidate node at the validation module, wherein the relayed request for a network address is transmitted to the network address server in response to capturing the second request.

17. The non-transitory computer-readable medium of claim 16, wherein the network is an Internet protocol (IP) network.

18. The non-transitory computer-readable medium of claim 17, wherein the second request for a network address is an IP renewal request.

19. The non-transitory computer-readable medium of claim 15, wherein determining whether the candidate node satisfies the set of security criteria is implemented on the quarantined server.

* * * * *